United States Patent [19]
Petrus

[11] 3,783,922
[45] Jan. 8, 1974

[54] BLIND MOUNTING FASTENER
[75] Inventor: Stephen Petrus, Parma, Ohio
[73] Assignee: Eaton Corporation, Cleveland, Ohio
[22] Filed: Sept. 5, 1972
[21] Appl. No.: 286,511

[52] U.S. Cl. .................................. 151/41.74, 85/84
[51] Int. Cl. ............................................ F16b 13/06
[58] Field of Search .................... 151/41.74; 85/66, 85/71, 73, 74, 75, 84, 85

[56] References Cited
UNITED STATES PATENTS

| 2,832,254 | 4/1958 | Viger et al. | 151/41.74 |
| 3,304,828 | 2/1967 | Karhu | 85/66 |
| 3,313,200 | 4/1967 | Fischer | 85/75 |
| 3,413,886 | 12/1968 | Proctor | 151/41.74 |

FOREIGN PATENTS OR APPLICATIONS

| 1,009,399 | 11/1965 | Great Britain | 85/66 |

Primary Examiner—Marion Parsons, Jr.
Attorney—Howard D. Gordon et al.

[57] ABSTRACT

A caged nut or bolt for assembly and retention preferably in a round mounting hole in a blind panel. The retainer is formed integrally from a flat blank and has a base with central aperture for bolt clearance and a pair of integral leg portions extending outwardly from the base in cupped arrangement. The free ends of the legs have transverse portions formed in semicircular configuration with the edges flanged radially outwardly. Each of the transverse portions has a pair of integral lugs extending therefrom toward the base with the ends of the lugs flared outwardly. Integral outwardly extending tabs are provided on the base in cupped arrangement for retaining a nut or bolt head centrally between the tab and leg portions. Portions of the tabs and legs are chamfered or sized near the base portion to permit insertion of the retainer, with a nut or bolt head therein, in a panel mounting hole of a diameter substantially that of a circle including the nut points. Where a nut is caged, a bolt is inserted through the mounting hole, threaded into the nut, and tightened to draw the nut away from the base portion toward the panel undersurface. As the bolt is tightened, the leg and lug portions of the retainer are wedged between the edge faces of the nut and the wall of the mounting hole, and the nut is thereby secured in the mounting hole. Where a bolt is used, the head of the bolt is received between the leg portions and the shank extends outwardly of the retainer between the radially flanged portion. A nut is threaded over the bolt to draw the bolt head away from the base portion toward the panel undersurface wedging the leg portion between the wall of the mounting hole and the bolt head.

9 Claims, 9 Drawing Figures

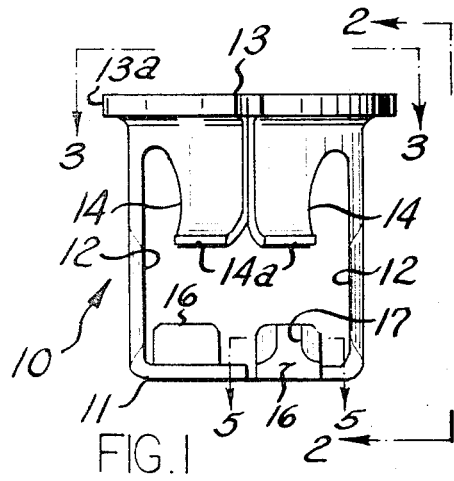
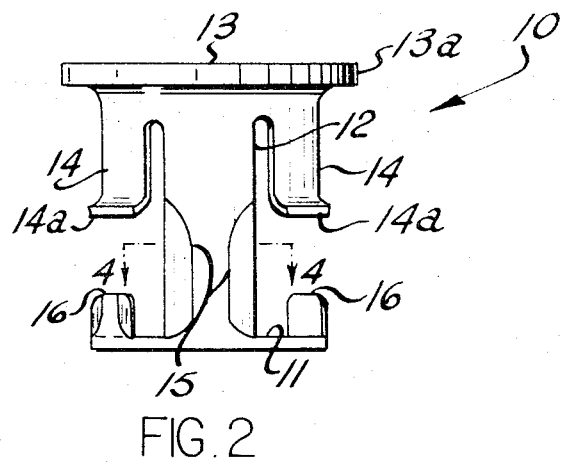
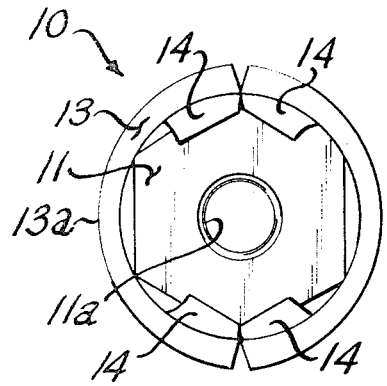
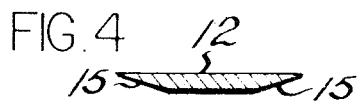
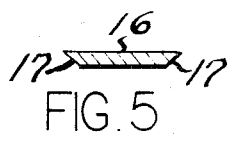
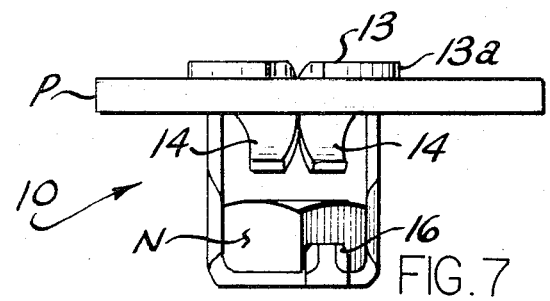
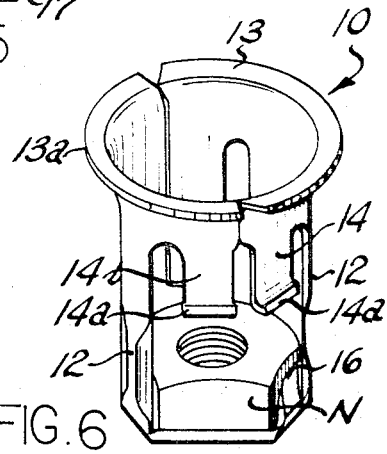
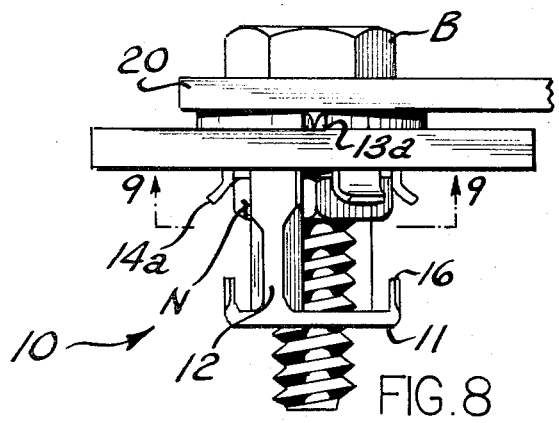
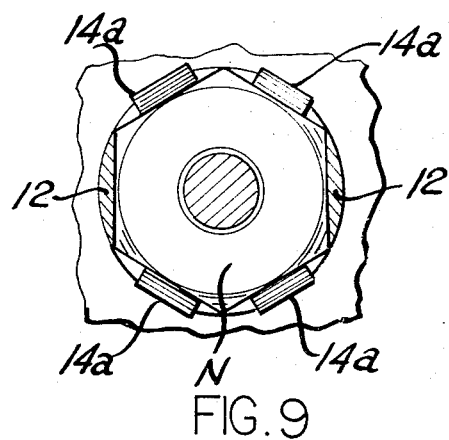

3,783,922

BLIND MOUNTING FASTENER

BACKGROUND OF THE INVENTION

Where it is desirable to attach an article or additional structure to a panel having the reverse side "blind" or not accessible, it is usually necessary to provide a mounting hole in the panel for the installation of attachment fasteners. Several types of fasteners are known for such blind installations as, for example, toggle-bolts, tubular blind rivets having internal threads and spring clips having tabs deformable for insertion through the hole and other tabs for engagement with the threads on a bolt or screw. However, most of the previously known devices for attachment of fasteners to a blind mounting hole in a panel have required special mounting tools or hole preparation and have often not provided sufficient retaining force to utilize the full strength of the threads provided on the attachment screw or bolt.

Thus, it has long been desirable to provide a means or technique for assembling a common machine nut from the front onto the back or blind side of a blind panel for retention of a conventional machine screw bolt. It is known in the art, for example, as taught by U. S. Pat. No. 2,832,254, that a specially prepared and slotted round nut could be inserted into a blind hole and retained therein by a cage-type nut retainer. However, assemblies of this type do not permit installation of a common nut, but instead require a specially machined and slotted nut which must be provided with each of the retainers. This means that the retainer and nut must be preassembled and supplied as a unit for each desired size of nut thread. The special nature of the nut makes this type of blind fastener prohibitively expensive for many large-volume applications. Therefore, the need has arisen for a blind nut retainer which could be fabricated for given conventional nut sizes and loaded or assembled with a conventional nut. Such an arrangement is desirable since it would enable assembly of machine bolts in blind panel installations without the requirement for special tools or special fasteners and would thus take advantage of the inherent low cost of the common machine screw, or bolt, and nut combination fastening means.

SUMMARY OF THE PRESENT INVENTION

The present invention relates to the assembly of fasteners where it is desired to provide a means of attachment onto a panel where the reverse side of the panel is not accessible. More particularly, this invention relates to fasteners of the type inserted in a blind hole in a panel. The present invention provides a retainer which receives a common machine nut centrally therein and the retainer and nut are inserted from the front into a hole formed in the panel and the nut retained therein for assembly of a machine screw or bolt thereto. The retainer of the present invention requires no special hole preparation or installation tools. Once the nut is received in the retainer and positioned in the hole, a machine screw or bolt is threaded into the nut and tightened against the outer surface of the panel, drawing the nut partially into the panel mounting hole such that portions of the retainer are wedged between the sides of the nut and the wall of the mounting hole, in a manner which secures the nut in the mounting hole. The machine screw or bolt may then be removed and the nut remains installed in the panel.

The retainer has a base portion with a central aperture therein and integral leg portions extending outwardly from the base portion in cupped arrangement. The free ends of leg portions have transverse portions formed in arcuate configuration with the free edge thereof flanged radially outwardly. The transverse portions of each leg have lug portions extending outwardly therefrom toward the base portion with the free ends of the legs flared outwardly away from the base. The base has a plurality of tabs integral therewith and extending outwardly therefrom in cupped arrangement for retaining a nut centrally between the legs and tabs. The tabs and legs have portions thereof adjacent the base chamfered on the outer surface to permit assembly of retainer into a hole having a diameter substantially that of a circle containing the points of the nut.

BRIEF DESCRIPTION OF THE DRAWINGS

FIG. 1 is a side view of the preferred form of the retainer in the "as fabricated" condition;

FIG. 2 is a view similar to FIG. 1, with the retainer rotated through an angle of 90°;

FIG. 3 is a top view of the retainer of FIG. 1;

FIG. 4 is a sectional view taken along section-indicating lines 4—4 of FIG. 2;

FIG. 5 is a sectional view taken along section indicating lines 5—5 of FIG. 1;

FIG. 6 is a perspective view of the embodiment of FIG. 1 with a hexagonal nut received therein in preparation for installation into a panel mounting hole;

FIG. 7 is a side view of the assembly of FIG. 6 as it appears when installed in a panel mounting hole;

FIG. 8 is a view similar to FIG. 7 but with the retainer rotated through an angle of 60° and with a bolt and attachment installed with the nut drawn into position partially in the mounting hole; and FIG. 9 is a sectional view taken along section-indicating lines 9—9 of FIG. 8 and shows, in further detail, the position of a nut in the completely installed retainer.

DETAILED DESCRIPTION

Referring now to FIGS. 1, 2 and 3, the nut retainer of the present invention is shown in its preferred form as having a base portion 11 of generally hexagonal configuration to conform to the shape of a conventional nut which is to be received in the retainer. The base portion 11 has an aperture 11a, preferably a pierced or punched round hole, formed therein which aperture is of sufficient size so as to provide adequate clearance for passage of a screw or bolt of desired size. The base portion 11 has a plurality, preferably two, peripherally equally spaced leg portions 12, formed integrally therewith, which leg portions extend outwardly from the base portion in generally cupped arrangement. In the preferred form of the invention the leg portions 12 extend at right angles from a common face of the base portion 11.

Each of the leg portions has a transverse portion 13 formed on the free end thereof, with the transverse portion 13 formed in arcuate, preferably semicircular, configuration as illustrated in FIG. 3. The free edge of the transverse portions 13 is formed radially outwardly to a flange 13a, which flange provides a surface for registering of the retainer against the front of the panel in which the retainer is to be mounted. Each of the transverse portions 13 has at least one, and preferably two, lug portions 14 extending from the transverse portion 13 toward the base portion 11 in spaced, preferably substantially parallel, relationship with respect to the leg portions 12. In the preferred practice of the invention the pair of lugs 14 are disposed on opposite sides of the leg portion 12. The free ends 14a of the lug portions are flared outwardly, in a direction away from the base portion, to provide a leading surface for wedging the nut against the leg portions and also to prevent withdrawal of the retainer from the mounting hole in the panel after the retainer and nut have been completely installed.

The base portion 11 of the retainer further has a plurality of tab portions 16 formed integrally therewith extending outwardly from the base portion in generally cupped arrangement, with the tabs preferably at right angles to the base portion 11. In the present and preferred form of the invention illustrated in the drawings, a pair of tabs are provided and disposed in diametrically opposed relation about the base portion. For applications in which hexagonal nuts are to be used, the tabs are spaced respectively at a central angle of 60° from the adjacent leg portion; however, for installation of a square nut, the tabs would be spaced 90° from the leg portions.

In order to permit ease of assembly of the retainer into a mounting hole having a diameter substantially that of a circle containing the points of the nut, the leg portions and tabs have respectively chamfered portions 15 and 17 provided thereon in the regions of the leg portion adjacent the base portion and in the region of the tabs adjacent the free ends thereof, as shown in FIGS. 1, 2, 4 and 5. The retainer 10 is formed to the configuration of FIGS. 1 – 3 from a flat blank (not shown), preferably by successive die-forming operations. In the preferred practice of the invention, the chamfered portions are also formed by die-forming; however, other fabricating techniques may be used if desired. The chamfered portions 15 and 17 give the leg portions and tabs a contoured shape such that, when a nut is received centrally between the leg portions and the tabs, the edges of the leg portion and the tab do not protrude beyond a circle containing the points of the nut. This chamfered configuration of the tabs and leg portions thus prevents wedging of the retainer in the mounting hole at the onset of installation. In the completely fabricated form illustrated in FIGS. 1 – 3, the retainer 10 has the lug portions biased slightly inwardly to permit the flared ends 14a to pass through the mounting hole. Upon installation into the mounting hole, a light tap from a hammer or other suitable tool will permit passage of the nut and adjacent portions of the legs and tabs through the mounting hole and thus permit the underside of the flanges 13 to register against the front surface of the panel.

Referring to FIG. 6, the completely formed retainer 10 is illustrated as it appears with a nut received therein, in preparation for installation into a panel mounting hole. In the presently preferred practice of the invention, the retainer is formed with the nut N assembled therein as shown in FIG. 6. However, in the alternative, the retainer may be completely fabricated to the form illustrated in FIG. 2 and the nut assembled therein prior to installation. If the latter procedure is utilized, it will be noted that, in order to assemble the nut N into the retainer 10, it is necessary to push the nut between the inwardly biased lugs 14, spreading the lugs as the nut is moved toward the base portion 11. When the nut has passed the lugs and is in contact with the face of the base portion 11, the lug portions 14 snap back to their originally inwardly biased position to prevent inadvertent removal of the nut N from the retainer. However, as mentioned above, the nut and retainer are preferably assembled during forming of the retainer.

Referring now to FIG. 7, the assembly of the nut in the retainer 10 is shown as it appears when initially assembled through a mounting hole in a panel P. Referring now to FIGS. 8 and 9, the retainer and nut are illustrated as they appear when the installation is completed. In the completely installed configuration illustrated in FIGS. 8 and 9, a bolt B is inserted through the mounting hole in the panel and through the article or support 20 to be attached to the panel, and the bolt is tightened against the article 20, and the nut is drawn toward the under-surface of the panel P. As the bolt B is tightened, the nut approaches the under-surface or blind side of the panel P and the nut contacts the flared portions 14a of lugs 14 and spreads the lugs slightly so that the flared ends 14a of the lugs extend outwardly beyond the hole edge. As the nut continues toward the panel, the lugs 14 and the leg portions 12 are wedged intermediate the sides of the nut and wall of the mounting hole. When the nut is partially wedged in the mounting hole, the flared portions 14a of the lug portions 14 extend outwardly over the edge of the panel mounting hole to prevent removal of the nut and retainer from the panel P. The bolt B may be left in the position, as shown in FIG. 8 with the article or supporting structures 20 attached, or the bolt may be subsequently removed for attachment of other articles or structures.

Although not illustrated in the drawings, the retainer of the present invention may also be used with a bolt head retained therein in place of a nut. It will be readily apparent to those skilled in the art that the head of a common hex-headed machine bolt may be assembled into the retainer in a manner similar to the nut N. Where a bolt head is caged in the retainer, the threaded shank of the bolt extends outwardly of the retainer 10 between the flanges 13. When the retainer 10 is assembled with a bolt therein, the retainer is inserted in a panel mounting hole, similar to the arrangement of FIG. 7, only with the bolt shank extending upward but through the mounting hole. A nut may then be threaded over the bolt shank to draw the bolt head away from the base 11 and toward the panel undersurface and wedging the leg portions 12 between the mounting hole and the bolt head.

Although the invention has been described and illustrated as applied to installations of the more common hexagonal machine nuts, it will be apparent that the retainer of the present invention may also be used with nuts having a square configuration.

The present invention thus provides a unique retainer for blind installation of a common machine nut or bolt into a mounting hole in a panel. The retainer of the present invention is conveniently formed from a unitary flat blank; and, with a nut or bolt head assembled therein, is installed into a blind-panel mounting hole without the requirement of special tools or mounting hole preparation.

Modifications and variations of the invention will be apparent to those having ordinary skill in the art and the invention is limited only by the following claims.

I claim:

1. A retainer for blind-hole assembly of a nut comprising:
   a. a base portion having an aperture therein for clearing a bolt;
   b. at least two leg portions integral with and extending longitudinally outwardly from said base in peripherally equally spaced cupped arrangement, each leg having a transverse portion formed at the free end thereof, with each of said transverse portions formed in arcuate configuration with the free edge thereof flanged radially outwardly;
   c. at least one lug portion integral with each of said transverse portions extending therefrom toward said base, with each of said lug portions having the free end thereof bent outwardly in a direction away from said base; and
   d. a plurality of tabs formed integral with and extending outwardly from the periphery of said base in cupped arrangement, said tabs being adapted for retaining a flat sided nut centrally between said leg portions and said tabs, such that when the base and leg portions, with said nut therein, are received in a mounting hole sufficient for clearing the points of said nut but insufficient for clearing said radial flanges and said nut is threadedly engaged by a bolt through said mounting hole and drawn away from said base portion by tightening the bolt, said lug and leg portions are wedged intermediate the sides of said nut and the wall of the mounting hole and said nut is secured therein.

2. The nut retainer defined in claim 1, wherein
   a. each of said leg portions has the longitudinal edges thereof chamfered on the outer surface thereof in the region adjacent said base; and,
   b. each of said tab portions has the longitudinal edges thereof chamfered on the outer surfaces thereof in the region adjacent the free end thereof and said leg and tab portions each have a thickness not exceeding the difference between the radius of a circle containing the points of said nut and the radius of a circle inscribed in and tangent to the sides of said nut.

3. The nut retainer defined in claim 1, wherein
   a. said retainer has two leg portions disposed in diametrically opposite relationships about said base;
   b. said transverse portions, and said radially extending flange are each formed in semicircular arcs;
   c. said retainer has two lug portions extending from each of said transverse portions with the lug portions disposed on opposite sides of the adjacent leg portion.

4. The nut retainer defined in claim 1, wherein said retainer has a pair of said tabs disposed in diametrically opposed relationship about said base.

5. The nut retainer defined in claim 1, wherein each of said lug portions is disposed in spaced substantially longitudinally parallel relation with the adjacent leg portion.

6. The nut retainer defined in claim 1, wherein said lug portions are biased inwardly of said leg portions for preventing inadvertent removal of a nut assembled in said retainer prior to installation of the retainer into a mounting hole.

7. The nut retainer defined in claim 1, wherein said leg and lug portions have a thickness substantially that of the difference between the radius of a circle containing the points of the nut to be installed and the radius of a circle inscribed tangent to the sides of said nut.

8. A blind mounting fastener comprising:
   a. a flat sided nut;
   b. a base portion having an aperture therein for clearing a bolt;
   c. at least two leg portions integral with and extending longitudinally outwardly from said base in peripherally equally spaced cupped arrangement, each leg having a transverse portion formed at the free end thereof, with each of said transverse portions formed in arcuate configuration with the free edge thereof flanged radially outwardly;
   d. at least one lug portion integral with each of said transverse portions extending therefrom toward said base, with each of said lug portions having the free end thereof bent outwardly in a direction away from said base; and
   e. a plurality of tabs formed integral with and extending outwardly from the periphery of said base in cupped arrangement, wherein said nut is received centrally between said leg portions and said tabs and in contact with said base portion, such that when the base and leg portions are received in a mounting hole sufficient for clearing the points of said nut, but insufficient for clearing said radial flanges and said nut is threadedly engaged by a bolt through said mounting hole and drawn away from said base portion by tightening the bolt, said lug and leg portions are wedged intermediate the sides of said nut and the wall of the mounting hole and said nut is secured partially in said hole.

9. A blind mounting fastener comprising:
   a. a machine bolt having a flat sided head;
   b. a base portion;
   c. at least two leg portions integral with and extending longitudinally outwardly from said base in peripherally equally spaced cupped arrangement, each leg having a transverse portion formed at the free end thereof, with each of said transverse portions formed in arcuate configuration with the free edge thereof flanged radially outwardly;
   d. at least one lug portion integral with each of said transverse portions extending therefrom toward said base, with each of said lug portions having the free end thereof bent outwardly in a direction away from the base; and,
   e. a plurality of tabs formed integrally with and extending outwardly from the periphery of said base in cupped arrangement, wherein the head of said bolt is received centrally between said leg portions and said tabs and in contact with said base portion with the threaded shank of said bolt extending away from said base and beyond said radial flanges, such that when the base and leg portions are received in a mounting hole sufficient for clearing the points of said head, but insufficient for clearing said radial flanges and said bolt is threadedly engaged by a nut and the head thereof drawn away from said base by tightening said nut, said lug and leg portions are wedged intermediate the sides of said bolt head and the wall of the mounting hole and said bolt is secured therein.

* * * * *